Patented Feb. 7, 1950

2,496,267

UNITED STATES PATENT OFFICE 2,496,267

SOLUTION OF ACRYLONITRILE POLYMERS

David W. Chaney, Nether Providence Township, Delaware County, Pa., assignor to American Viscose Corporation, Wilmington, Del., a corporation of Delaware No Drawing. Application April 5, 1948, Serial No. 19,153

4 Claims. (Cl. 260—32.4)

This invention relates to new compositions of matter comprising solutions of copolymers of acrylonitrile and vinyl acetate in acetonitrile which are suitable for use in the manufacture of synthetic filaments and other shaped articles.

This application is a continuation in part of my prior application Serial No. 518,243, filed January 14, 1944, now abandoned.

Polymers of acrylonitrile containing 65 mol per cent or more of acrylonitrile in the copolymer molecule are insoluble in practically all of the inexpensive and readily available organic solvents. The solvents which have been proposed heretofore for acrylonitrile polymers of this type have been substances which are not generally available and must be prepared especially by complicated and expensive procedures. Moreover, in many cases, the organic substances heretofore proposed for effecting dissolution of acrylonitrile polymers containing a high proportion of acrylonitrile in the molecule dissolve or retain the polymers in solution only at elevated temperatures of 100° C. or higher.

The only solutions of acrylonitrile polymers in a readily available and inexpensive solvent known heretofore have been solutions of acrylonitrile copolymers which contain comparatively small amounts of acrylonitrile in the polymer molecule. For example, copolymers of acrylonitrile and vinyl acetate can be dissolved in acetone if the proportion of acrylonitrile in the copolymer molecule is considerably below 65 mol per cent. Solutions which are obtainable by dissolution of acrylonitrile-vinyl acetate copolymers in acetone are not useful for the production of valuable synthetic filaments or fibers, however, because the filaments obtained from such solutions do not have physical properties, such as tenacity, toughness, etc. which render them adapted to textile use.

I have now found that copolymers of acrylonitrile and vinyl acetate containing, in the polymer molecule from 65 to 80 mol per cent of acrylonitrile which are insoluble in acetone and all other common organic solvents, can be dissolved in acetonitrile to give solutions which are eminently satisfactory for the production of tough, flexible, colorless filaments and yarns which are suitable for use in practically all commercial applications of such products.

The solutions of the invention are prepared by introducing the copolymer, in particulate condition, into acetonitrile and stirring the mixture at room temperature until dissolution of the copolymer is complete and a clear, homogeneous spinning or casting solution is obtained. The copolymers are completely dissolved in acetonitrile at room temperature in a short time.

Shaped structures and articles can be produced from the solutions by extruding the solutions into an evaporative or coagulating medium.

The discovery that acetonitrile dissolves the acrylonitrile-vinyl acetate copolymers and retains them in solution is important, because acetonitrile is a solvent having properties particularly well adapted to and having outstanding advantages for use in both dry and wet spinning procedures.

In dry spinning processes, the filaments are formed by evaporation of the solvent in an evaporative medium. Because of the relatively low boiling point of acetonitrile, shaped structures may be obtained by extruding solutions of the copolymers therein into an evaporative atmosphere, such as air, nitrogen, or any other gas inert to the copolymers, at only moderately elevated temperatures of 85 to 90° C. Prolonged exposure of the filaments to the evaporative medium is not required and spinning cells of conventional dimensions may be employed.

In wet spinning, the shaped structures are formed by selective solution of the solvent in a liquid medium which is a non-solvent for the copolymer. Here, the relatively low molecular weight and consequent high rate of diffusion of acetonitrile are of outstanding advantage. Filaments formed by extruding the solutions of the copolymers in acetonitrile into a bath of a liquid which is a solvent for acetonitrile and a non-solvent for the copolymer, for example, isopropanol can be withdrawn after only a short run of from 12 to 14 inches in the bath substantially at room temperature, and are found to have excellent handling properties. Heated spinning baths are not required.

Shaped articles comprising the acrylonitrile-vinyl acetate copolymers containing, in the molecule, from 65 to 80 mol per cent acrylonitrile obtained from solvent solutions of the copolymers in accordance with the invention and from which the solvent is subsequently removed either by evaporation or selective extraction, are substantially free of foreign matter and voids and substantially undecomposed and chemically unchanged from the copolymers prior to their dissolution in acetonitrile.

The acrylonitrile-vinyl acetate copolymers which are dissolved in acetonitrile in accordance with the invention may be produced in any suitable manner. For example, they may be prepared by copolymerizing the monomers in aqueous emulsion under conditions such that the ratio of monomeric acrylonitrile to monomeric vinyl acetate present in the reaction mass is controlled during the course of the reaction to produce copolymers consisting of polymeric chains having a composition which approximates the composition of the copolymer as a whole. This may be accomplished by initially mixing the monomers in a low ratio with respect to acrylonitrile, and then adding controlled increments of acrylonitrile, or of a mixture of the monomers in which acrylonitrile predominates, to the reaction. Alternatively, monomeric acrylonitrile and vinyl acetate may be added to the reaction mixture separately, the acrylonitrile being added in an amount greater than the amount of vinyl acetate. Instead of adding controlled increments of the acrylonitrile or monomeric mixture, the addition may be performed continuously at a controlled rate.

Any of the usual emulsifying agents may be used. Preferably, however, the emulsifying agent comprises an aqueous dispersion of a mixture consisting of Turkey red oil, sodium tri-isopropyl naphthalene sulfonate, and isoamyl alcohol, stabilized by the addition of a small amount of gelatin, or an aqueous dispersion of methyl cellulose.

The copolymerization may be carried out in the presence of a catalyst such as an organic or inorganic peroxygen compound, benzoyl peroxide and potassium persulfate being representative. The catalyst may be present in small amounts of about 0.5 to 2% on the total weight of the monomers. Copolymerization may be effected at temperatures of from room temperature to 65° C. or higher, the preferred temperature range being from about 45 to 65° C.

To produce copolymers containing in the molecule from 65 to 80 mol percent of acrylonitrile and soluble in acetonitrile, the ratio of monomeric acrylonitrile to monomeric vinyl acetate is maintained, throughout the polymerization, at from about one or less than one part of acrylonitrile by weight to about three or more parts of vinyl acetate by weight. In this manner the differences in the rates of acceptance of the monomers into the copolymer molecule are compensated. Acrylonitrile has the faster rate of acceptance into the copolymer molecule, as a result of which, when the ratio of the monomers is maintained constant at one or less than one part of acrylonitrile to three or more parts of vinyl acetate, the proportion of acrylonitrile to vinyl acetate in the copolymer molecule is reversed, and copolymers containing, in the molecule, approximately three or more parts of acrylonitrile to one or less parts of vinyl acetate are obtained. For example, when a monomer mixture comprising 12 parts of acrylonitrile and 38 parts of vinyl acetate is subjected to copolymerization under the conditions described, and a monomer mixture consisting of 77.6% by weight of acrylonitrile and 22.4% by weight vinyl acetate is added at the rate of 2.5 parts/hour over a period of about 16 hours at about 60° C. the ratio of the monomers present in the reaction mass and available for copolymerization is held substantially constant at about three parts vinyl acetate to one part acrylonitrile. Due to the difference in the rate at which the monomers enter the copolymer molecule, however, in the copolymers obtained at the end of the 16 hour period, acrylonitrile is present in the polymer molecule in an amount about three times the amount of vinyl acetate. Specifically, the product contains, in the polymer molecule, about 73.3 mol percent acrylonitrile and 26.7 mol percent vinyl acetate. By varying the copolymerization time, the temperature and the rate of addition of the monomeric mixture to the reaction copolymers containing 65 to 80 mol percent acrylonitrile in the polymer molecule are obtained. The amount of acrylonitrile present in the copolymer molecule may be as high as four times the amount of vinyl acetate. It may also be slightly less than three times the amount of vinyl acetate, for example, the copolymer may contain 65 mol percent acrylonitrile in the molecule. However, the copolymers which are soluble in acetonitrile and insoluble in acetone do not contain acrylonitrile in an amount less than 65 mol percent or more than 80 mol percent.

The copolymers which are dissolved in acetonitrile to produce clear spinning and casting solutions in accordance with the invention may also be obtained by copolymerizing acrylonitrile and vinyl acetate in appropriate proportions, in aqueous emulsion, under conventional conditions to produce a copolymer of heterogeneous composition and comprising a fraction in which the acrylonitrile is present in the polymer molecule in an amount of from 65 to 80 mol percent and then fractionating the copolymerization product to separate out the acetonitrile soluble fraction. This method of producing acetonitrile-soluble copolymers is illustrated in Example III, below.

The articles formed from acetonitrile solutions of the acrylonitrile-vinyl acetate copolymers by either the wet or dry spinning technique are preferably subjected to a stretching operation. This may be accomplished, for instance, by passing the yarn between two positively driven rollers the peripheral speeds of which are so adjusted that the yarn is given a stretch of from about 100% up to 900%. The stretching can be performed at room temperature or at higher temperatures, which are below the decomposition temperature for the copolymers. The yarn is also preferably subjected to an after-stretch of from about 100 to 1000% in a steam cell at temperatures of from about 85 to 95° C., whereby the physical properties of the structure, including tenacity, resilience, etc., are improved. The following examples will illustrate specific preferred embodiments of the invention.

*Example I*

A copolymer containing, in the polymer molecule, about 73.3 mol percent of acrylonitrile and 26.7 mol percent of vinyl acetate was produced in the following manner:

About 1% of benzoyl peroxide was dissolved in a mixture consisting of 12 parts by weight of acrylonitrile and 38 parts by weight of vinyl acetate, and the mixture was shaken with an amount equal to twice its weight of an emulsifying agent consisting of 100 grams of water containing 0.5 gram of Turkey-red oil, 0.25 gram of sodium tri-isopropyl naphthalene sulfonate, 0.2 ml. of isoamyl alcohol, and 1.6 grams of gelatin. The emulsion was poured into a vessel and stirred at a moderate rate for about 16 hours at 60° C. A mixture of monomers consisting of 77.6% by weight acrylonitrile and 22.4% by weight of vinyl acetate was added to the emulsion at a rate of 2.5 grams/hour. After 16 hours the product, in the form of a white granular solid suspended in the emulsion, was purified by pouring the emulsion into isopropanol, stirring for about ½ to 1 hours, and filtering. The copolymer had a high molecular weight as evidenced by a specific viscosity of 0.221 determined by the Staudinger viscometric method using acetonitrile at 25° C. The white granular solid was dissolved in acetonitrile to produce a spinning dope of 8% concentration. The solution thus obtained was spun into isopropanol at 30-32° C. The filaments thus formed were given an immersion of 14 inches, withdrawn from the bath, and stretched about 280% between godets. The stretched filaments were given an after stretch of 300% in a steam cell at 90° C.

*Example II*

A copolymer containing 74.3 mol per cent acrylonitrile and 25.7 mol per cent vinyl acetate in the polymer molecule was produced by the method of Example I except that the polymerization time was 8 hours, and the monomeric mixture consisting of 77.6 by weight acrylonitrile and 22.4 by weight vinyl acetate was added during the course of the polymerization at the rate of 3.0 parts per hour.

The copolymer was dissolved in acetonitrile to give a spinning dope of 15% concentration. The dope was extruded into a bath of isopropanol at 32° C. to form filaments which were given an immersion of 12 inches, stretched 400% between godets after their withdrawal from the bath, and given an after-stretch of 200% in a steam cell at 90° C.

Copolymers having the following compositions—

(A) 72.4 mol per cent acrylonitrile,
    27.6 mol per cent vinyl acetate;
(B) 69.5 mol per cent acrylonitrile,
    30.5 mol per cent vinyl acetate, were prepared in accordance with the methods of Examples I and II. These copolymers were dissolved in acetonitrile, and the solutions were used in the production of synthetic filaments as described.

*Example III*

A copolymer of acrylonitrile and vinyl acetate was prepared by dissolving about 2% of benzoyl peroxide in a mixture consisting of 22 parts by weight of acrylonitrile and 28 parts by weight of vinyl acetate, shaking the mixture with 100 parts by weight of a dispersion of about 0.5 gram of methyl cellulose in 100 grams of water, and subjecting the mixture to polymerizing conditions at a temperature of 50° C. for 60 to 70 hours. The copolymer occurred in the form of a white granular solid suspended in the emulsion. The emulsifying agents were removed by washing the product with water. The product was then extracted with 20 times its weight of acetone and the acetone-soluble fraction (8 parts by weight) was separated and discarded. The residue was extracted with acetonitrile and an acetonitrile extract containing 28 parts by weight of the desired copolymer was obtained. The copolymer was precipitated from isopropanol. The precipitated copolymer contained 79 mol per cent acrylonitrile and 21 mol per cent vinyl acetate in the molecule. It was dissolved in acetonitrile to give a spinning dope of 7% concentration. The dope was extruded into a bath consisting of isopropanol at 35° C. to form filaments which were withdrawn from the bath after a run of 14 inches, stretched between godets, and given an after-stretch of 500% in a steam cell at 90° C.

Copolymers obtained by fractionation of the non-uniform copolymers produced by the conventional emulsion polymerization process exemplified in Example III contained from about 77 mol per cent to about 80 mol per cent acrylonitrile, and about 23 to about 20 mol per cent vinyl acetate in the molecule. These copolymers had high molecular weights as evidenced by specific viscosities of about 0.31 and 0.44 determined by the Staudinger viscometric method using acetonitrile at 20° C.

Filaments produced from the acetonitrile solutions of the invention are characterized by dry tensile strengths of from about 1½ to 4 grams/denier, dry extensibilities of from about 20 to 40%; wet tensile strengths of from about 1 to 3.5 grams/denier, wet extensibilities of from about 18 to 35%. The solutions of the copolymers in acetonitrile may be formed into other masses such as films and sheets which are useful as insulating materials, wrapping sheets, and the like, and which are dimensionally stable and resistant to weather attack. Similarly, the acetonitrile solutions may be used as lacquers, coating compositions, adhesives, and impregnating agents. Pigments, fillers, plasticizing agents, or the like may be incorporated with the copolymers. Solutions intended for use in the manufacture of synthetic fibers may contain other adjuvents such as delustrants, lubricants, sizing agents, etc.

This invention provides a solvent for acrylonitrile-vinyl acetate copolymers containing, in the polymer molecule, from 65 to 80 mol per cent acrylonitrile, which has pronounced advantages over solvents which have been heretofore known for acrylonitrile copolymers containing preponderant amounts of acrylonitrile in the polymer molecule. By the practice of the invention, it is possible to prepare clear, stable solutions of the copolymers under ordinary temperature conditions, and using a solvent which is readily available, comparatively inexpensive, and ideally suited to the production of synthetic fibers or filaments, or other shaped structures, by either wet or dry spinning or casting procedures.

While preferred embodiments of the invention have been specifically described, the description is intended to be illustrative only, and it is to be understood that changes and variations may be made without departing from the spirit and scope of the invention as defined by the appended claims.

I claim:

1. As a new composition of matter, a copolymer of acrylonitrile and vinyl acetate containing in the polymer molecule from 65 to 80 mol per cent of acrylonitrile and the balance vinyl acetate, dissolved in acetonitrile.

2. As a new composition of matter, a copolymer of acrylonitrile and vinyl acetate containing in the polymer molecule 73.3 mol per cent of acrylonitrile and the balance vinyl acetate, dissolved in acetonitrile.

3. As a new composition of matter, a copolymer of acrylonitrile and vinyl acetate containing in the polymer molecule 74.3 mol per cent of acrylonitrile and the balance vinyl acetate, dissolved in acetonitrile.

4. As a new composition of matter, a copolymer of acrylonitrile and vinyl acetate containing, in the polymer molecule 72.4 mol per cent of acrylonitrile and the balance vinyl acetate, dissolved in acetonitrile.

DAVID W. CHANEY.

REFERENCES CITED

The following references are of record in the file of this patent:

UNITED STATES PATENTS

| Number | Name | Date |
|---|---|---|
| 2,404,726 | Charch | July 23, 1946 |